United States Patent
Porte et al.

(10) Patent No.: US 8,757,546 B2
(45) Date of Patent: Jun. 24, 2014

(54) DEVICE FOR SHROUDING AN AIRCRAFT NACELLE

(75) Inventors: Alain Porte, Colomiers (FR); Robert Andre, Lacroix Falgarde (FR); Matthieu Fargues, Montauban (FR)

(73) Assignee: Airbus Operations S.A.S., Toulouse (FR)

( * ) Notice: Subject to any disclaimer, the term of this patent is extended or adjusted under 35 U.S.C. 154(b) by 134 days.

(21) Appl. No.: 13/054,290

(22) PCT Filed: Jul. 15, 2009

(86) PCT No.: PCT/FR2009/051401
§ 371 (c)(1), (2), (4) Date: Jan. 14, 2011

(87) PCT Pub. No.: WO2010/007311
PCT Pub. Date: Jan. 21, 2010

(65) Prior Publication Data
US 2011/0114796 A1    May 19, 2011

(30) Foreign Application Priority Data
Jul. 18, 2008  (FR) ..................................... 08 54892

(51) Int. Cl.
*B64C 1/14* (2006.01)

(52) U.S. Cl.
USPC ..................................... 244/129.4; 244/53 R

(58) Field of Classification Search
CPC ...... B64C 1/1446; B64C 7/00; B64C 1/1407; B64C 1/12; B64C 3/26; B64D 29/06; B64D 33/04; B64D 33/02; B64D 2033/0253; B64D 29/08
USPC ...... 244/129.1, 129.4, 129.5, 131, 132, 53 B, 244/53 R
See application file for complete search history.

(56) References Cited

U.S. PATENT DOCUMENTS

| | | | | |
|---|---|---|---|---|
| 3,119,581 | A | * | 1/1964 | Trevaskis ..................... 244/53 B |
| 4,549,708 | A | * | 10/1985 | Norris ......................... 244/129.4 |
| 5,350,136 | A | * | 9/1994 | Prosser et al. .............. 244/129.4 |
| 7,147,185 | B2 | * | 12/2006 | Beaufort ..................... 244/53 B |
| 2006/0060697 | A1 | * | 3/2006 | Beaufort ..................... 244/53 B |

FOREIGN PATENT DOCUMENTS

| | | |
|---|---|---|
| EP | 1245769 A2 | 10/2002 |
| FR | 2861364 A1 | 4/2005 |

OTHER PUBLICATIONS

International Search Report, dated Nov. 26, 2009, from corresponding PCT application.

* cited by examiner

*Primary Examiner* — Brian M O'Hara
(74) *Attorney, Agent, or Firm* — Young & Thompson

(57) ABSTRACT

An aircraft nacelle includes an air intake (12) followed at the upper part by a part (14) integral with the mast, called a cap, and at least one door (16) with a curved profile, and a device for encircling it in the form of at least one flexible element (38), guide elements (40) for allowing the at least one flexible element (38) to follow the curved profile of the at least one door, a first anchoring point (42) of the at least one flexible element (38) integral with a first edge (78) of the cap and another anchoring point of the at least one flexible element (38) integral with a second edge (80) of the cap, whereby the anchoring points (42) allow a relative translational movement, in a direction that is parallel to the longitudinal axis of the nacelle, between the cap (14) and the at least one door (16).

9 Claims, 4 Drawing Sheets

Figure 2:
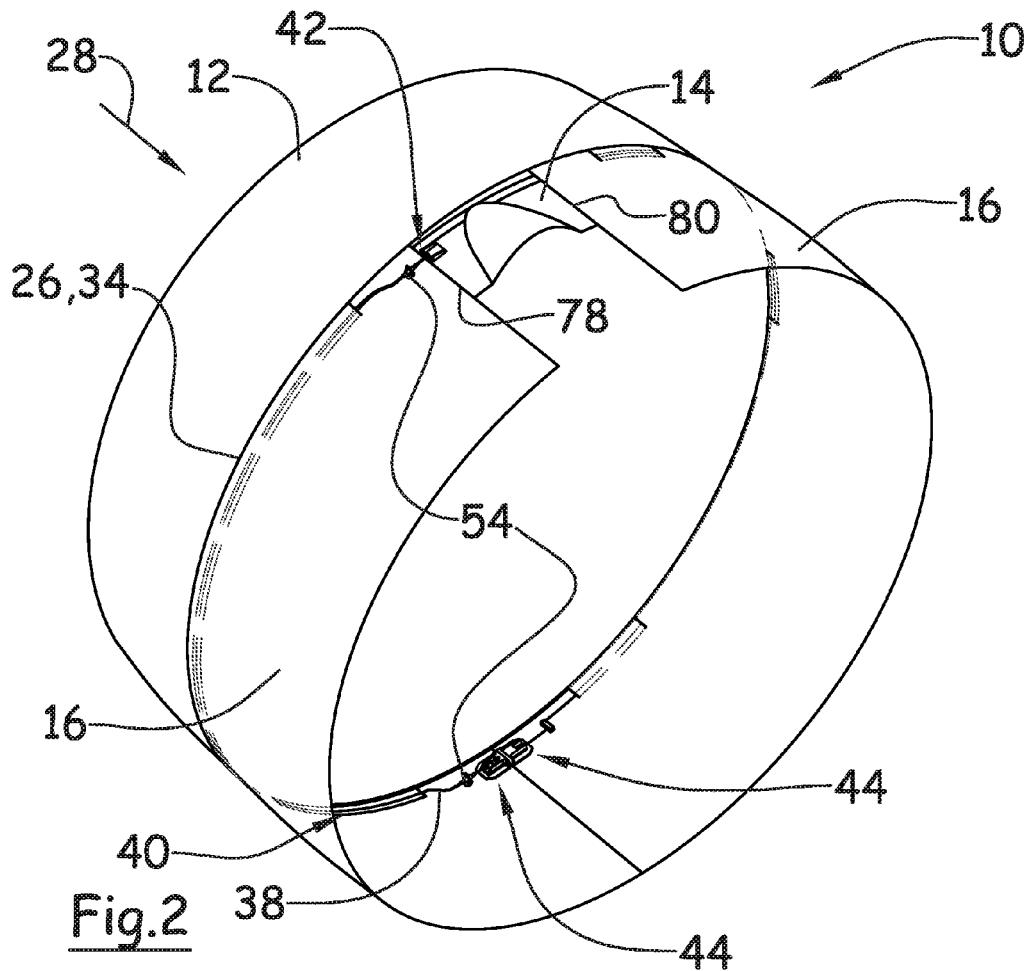

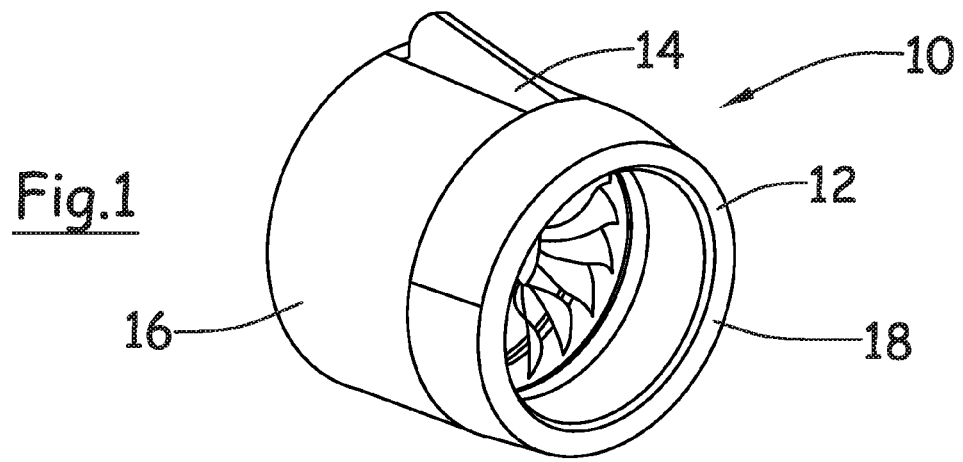
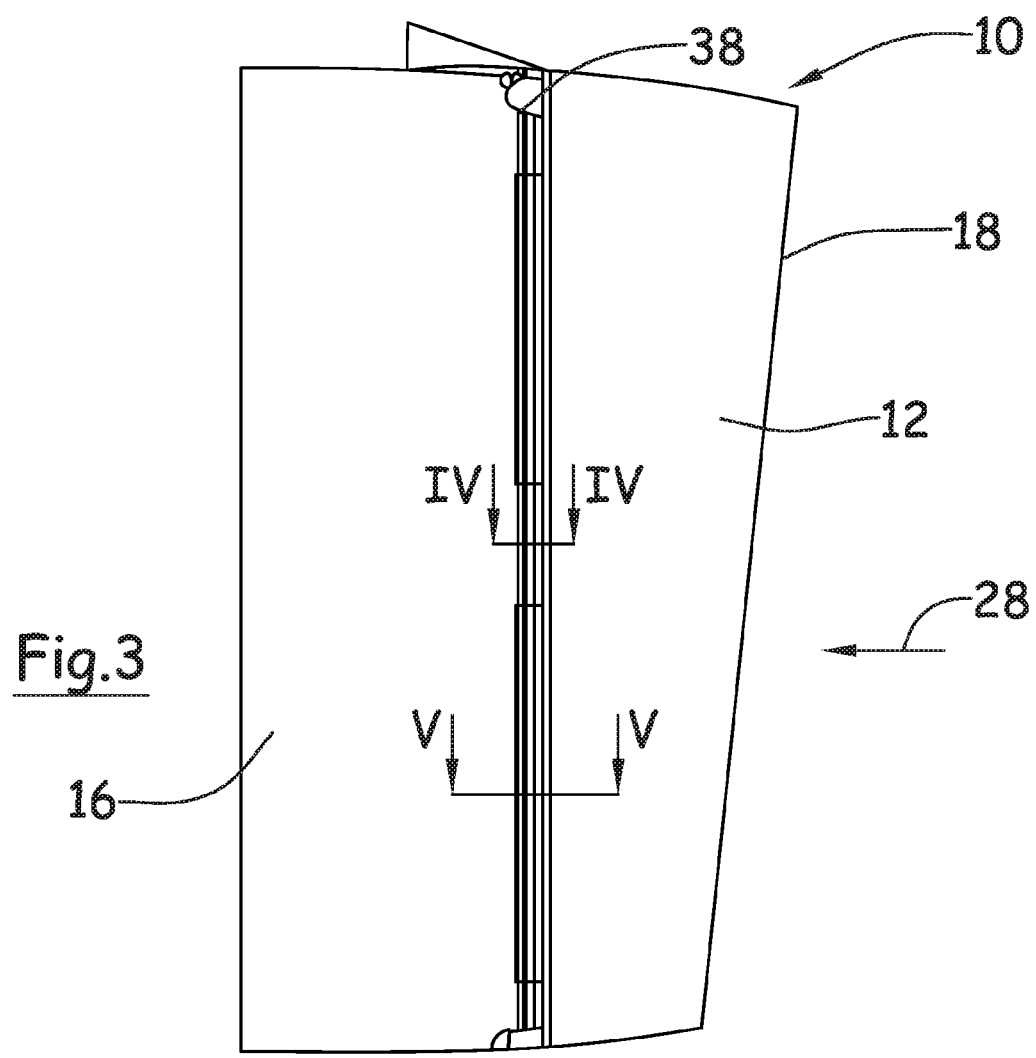

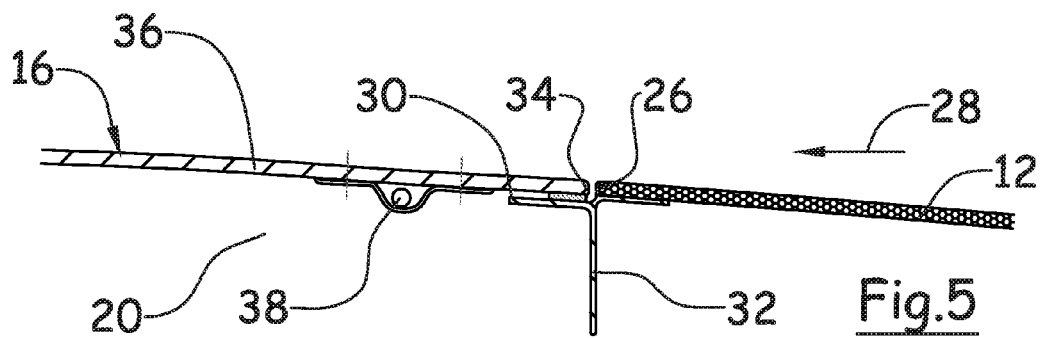
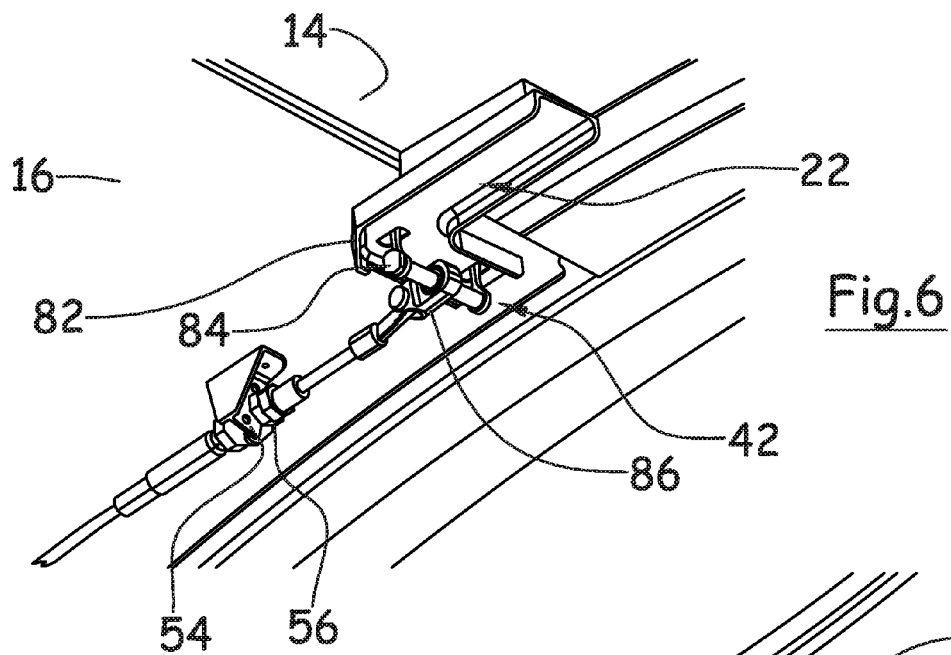
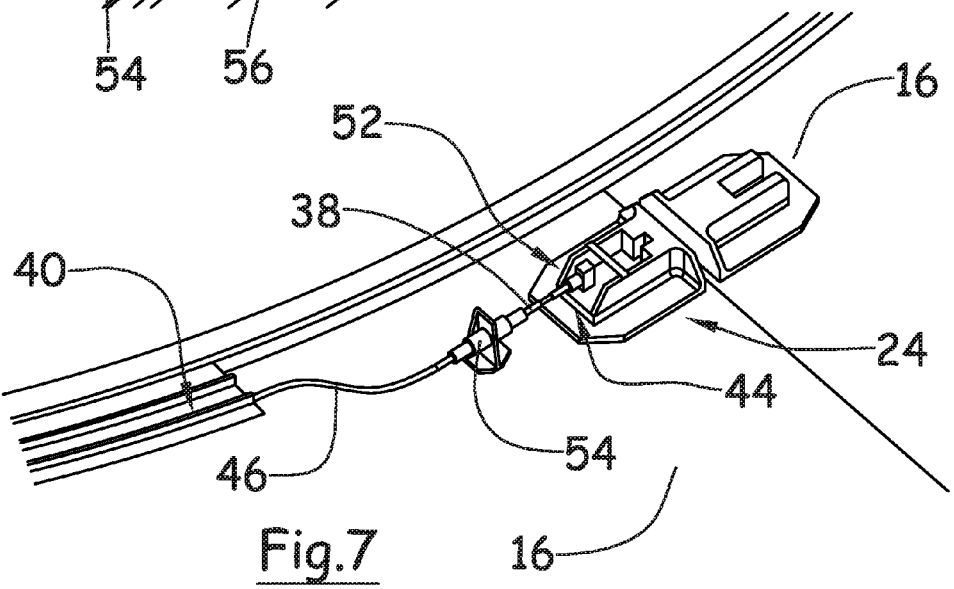

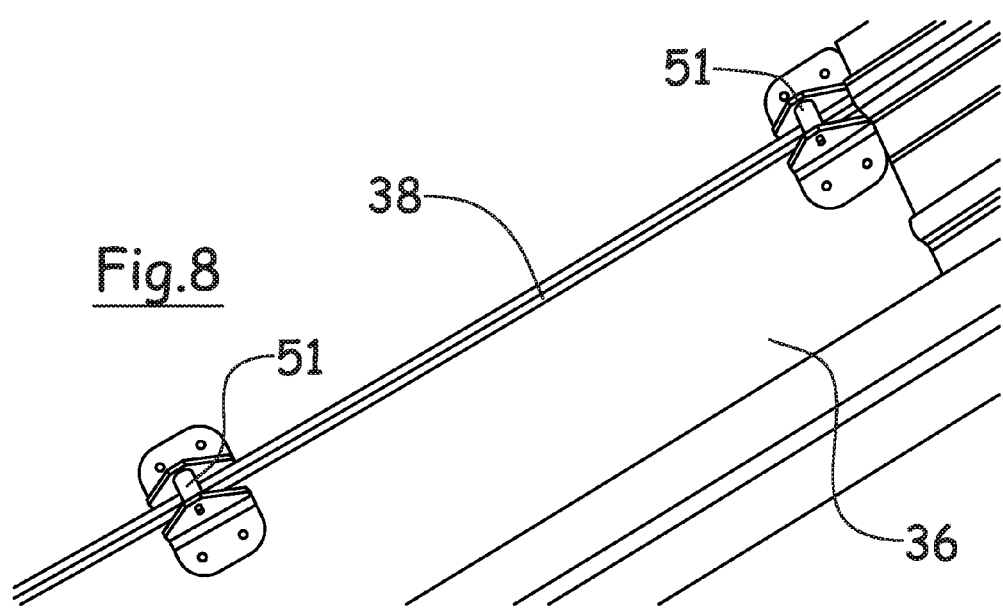
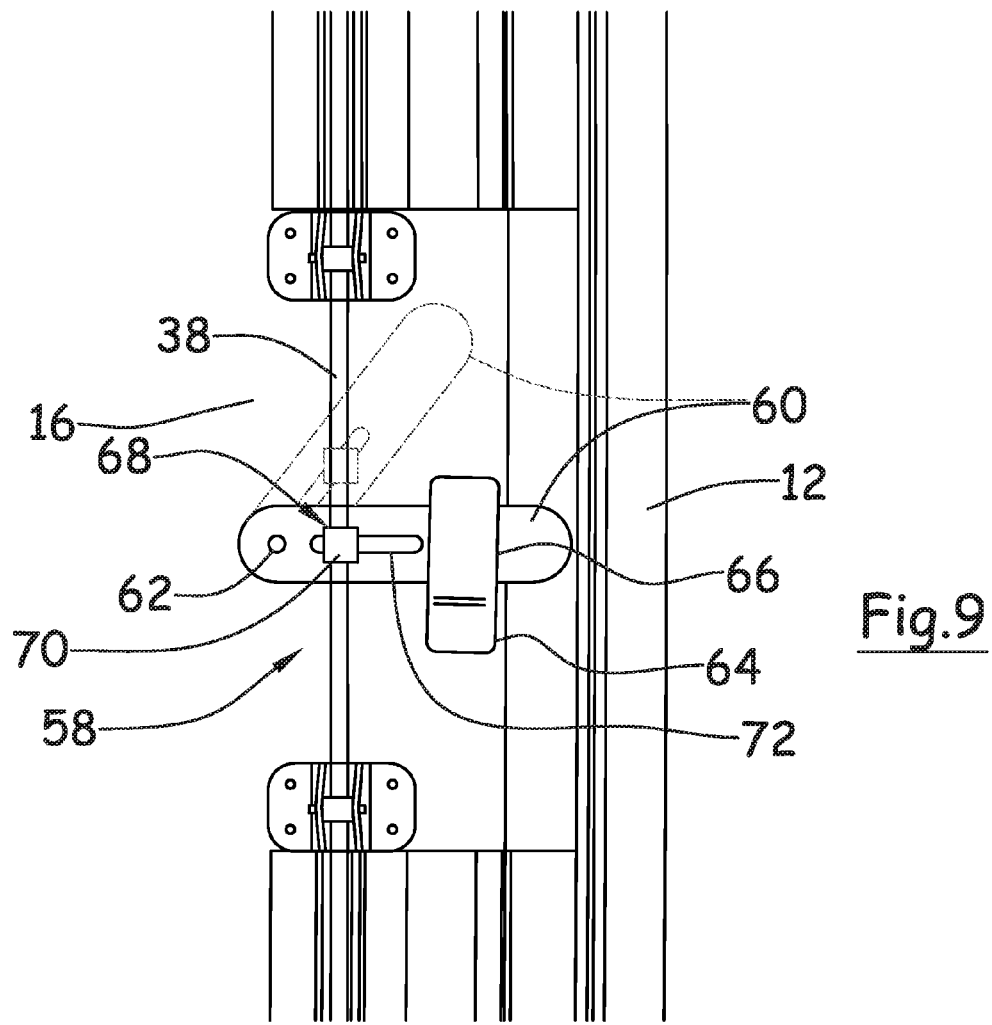

DEVICE FOR SHROUDING AN AIRCRAFT NACELLE

This invention relates to a device for encircling an aircraft nacelle so as to limit the scooping phenomenon.

An aircraft propulsion system comprises a nacelle in which a power plant that is connected by means of a mast to the other parts of the aircraft is placed in an essentially concentric manner.

The nacelle comprises an inside wall that delimits a pipe with an air intake at the front, a first portion of the entering air stream, called a primary stream, passing through the power plant to participate in the combustion, and the second portion of the air stream, called a secondary stream, being entrained by a fan and flowing into an annular pipe that is delimited by the inside wall of the nacelle and the outside wall of the power plant.

The nacelle also comprises an outside wall with essentially circular cross-sections that extends from the air intake to the rear outlet, consisting of the juxtaposition of several elements, an air intake that is essentially rigid at the front followed by nacelle doors, also called cowls.

The air intake is rigid because of its curved shapes and numerous reinforcements for withstanding forces generated by the aerodynamic flows or possible impacts.

The cowls are made movable to allow access to the power plant that is placed inside the nacelle. These cowls are articulated to the other parts of the nacelle in different ways depending on the kinematics adopted and extend from the top of the nacelle, close to the anchoring of the mast, to the bottom of the nacelle and have a semi-cylindrical shape.

A cowl generally comprises a piece of sheet metal with stiffeners on the inside surface to impart a relative rigidity thereto. The smooth outside surface of the cowl is sensitive to remaining in the extension of the outside surface of the other elements, in particular of the air intake, when the cowl is in the closed position.

Locking means are provided at the edges of the cowl so as to keep the cowl in the closed position.

In addition, the frame of the opening that is sealed by the cowl comprises—on its periphery—a contact surface against which the cowl can rest in such a way as to always keep its outside surface in the extension of that of the air intake.

Optionally, the contact surface of the frame can comprise a deformable element such as a compressible joint.

During flight, considering their relative rigidities, the cowls can become deformed, with the result that air can penetrate under said cowls into the interior of the nacelle at the junction with the air intake. This so-called scooping phenomenon reduces the aerodynamic performance levels of the aircraft, in particular by increasing the drag, which is reflected by a consumption of fuel.

So as to limit this phenomenon, a solution consists in increasing the number of stiffeners provided at the cowls. However, this solution goes against the desired result to the extent that the addition of stiffeners contributes to increasing the on-board weight and therefore the consumption of the aircraft.

According to another problem, the upper portion of the nacelle that is integral with the mast, also called a cap, has as its function to limit the drag at the junction of the nacelle and the mast. Under the aerodynamic loads during flight, the nacelle moves slightly relative to the mast and therefore relative to the cap, in particular along the longitudinal axis of the nacelle. Also, the cap is equipped with a complex system for absorbing the degree of freedom that corresponds to said relative movement along the longitudinal axis of the covering of the nacelle relative to said cap.

Also, the object of this invention is to eliminate the drawbacks of the prior art by proposing a device whose object is to limit the scooping phenomena and to simplify the connection between the cap and the nacelle without, however, significantly increasing the on-board weight.

For this purpose, the invention has as its object an aircraft nacelle that comprises an air intake that is followed at the upper part by a part that is integral with the mast, called a cap, and at least one door with a curved profile, characterized in that it comprises a device for encircling it in the form of at least one flexible element, guide means that make it possible for said at least one flexible element to follow the curved profile of said at least one door, a first anchoring point of said at least one flexible element that is integral with a first edge of the cap, and another anchoring point of said at least one flexible element that is integral with a second edge of the cap, whereby said anchoring points allow a relative translational movement in a direction that is parallel to the longitudinal axis of the nacelle, between the cap and said at least one door.

Figure 4:
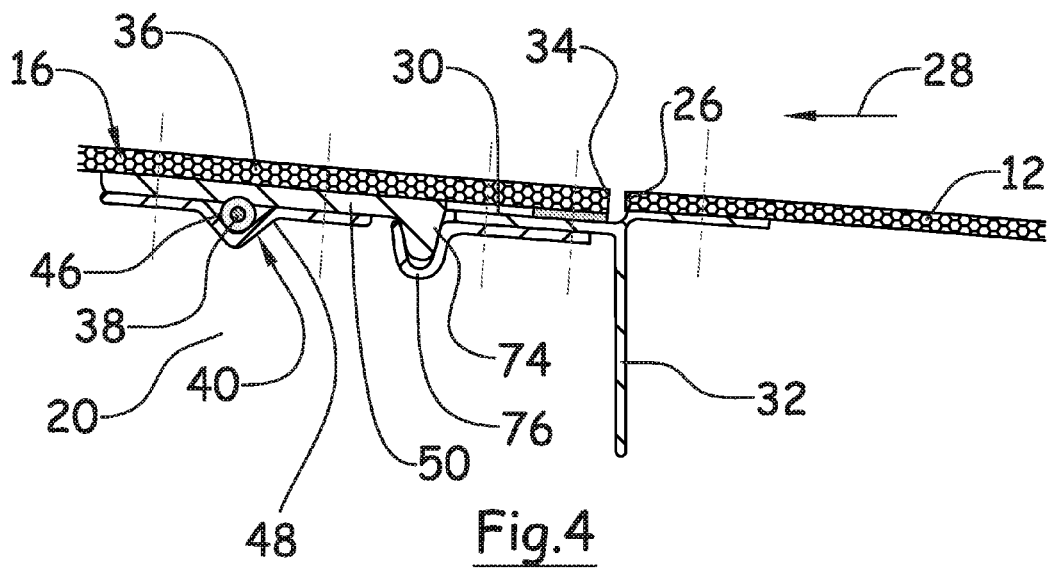

Other characteristics and advantages will emerge from the following description of the invention, a description that is provided only by way of example, relative to the accompanying drawings in which:

FIG. 1 is a perspective view that illustrates the front of a nacelle,

FIG. 2 is a diagram that illustrates in perspective the device for encircling the nacelle according to the invention, FIG. 3 is a diagram that laterally illustrates the device of the invention, FIG. 4 is a cutaway of the device of the invention along line IV-IV of FIG. 3, FIG. 5 is a cutaway of the device of the invention along line V-V of FIG. 3, FIG. 6 is a perspective view that illustrates the upper anchoring point of the device for encircling the nacelle, FIG. 7 is a perspective view for illustrating the lower anchoring point of the device for encircling the nacelle, FIG. 8 is a perspective view that illustrates an embodiment of the guide means of the device for encircling the nacelle, and FIG. 9 is a side view that illustrates—from the interior of the nacelle—indexing means that are controlled by the device for encircling the nacelle.

At 10, FIG. 1 shows an aircraft nacelle that can be connected by means of a mast to the other parts of the aircraft.

The object of this application is more particularly the outside surface of the nacelle. Also, the interior that is known to one skilled in the art is not presented in more detail.

The nacelle 10 generally has essentially circular cross-sections.

The outside surface of the nacelle comprises an air intake 12 at the front, followed by at least one part 14 that is connected to the mast, called a cap, in particular in the upper part at the mast, and at least one moving part 16.

At the front, the air intake comprises a lip 18 that describes an essentially circular shape that extends in a plane that can be approximately perpendicular to the longitudinal axis of the nacelle, or not perpendicular, with the part of the lip located just before 12 o'clock. However, other air intake shapes can be considered.

The air intake 12 is essentially rigid because of its curved shapes and numerous reinforcements for withstanding forces generated by the aerodynamic flows, in particular during flight, and optional impacts.

The air intake 12 is not presented in more detail because it is known to one skilled in the art.

The stationary upper part 14, also called a cap, has shapes that are suitable for limiting the drag at the junction of the nacelle and the mast. This stationary upper part is not presented in more detail because it is known to one skilled in the art.

Under the aerodynamic loads during flight, the nacelle moves slightly relative to the mast and therefore relative to the cap, in particular along the longitudinal axis of the nacelle.

Thus, the outside surface of the nacelle consists of juxtaposed outside surfaces of several elements.

The moving part 16 that is also called a door or cowl makes it possible to release an opening so as to access the interior of the nacelle, in particular for the maintenance of the power plant.

According to the configuration that is illustrated in FIGS. 2 and 3, the nacelle comprises two doors 16 that are arranged essentially symmetrically relative to the vertical median plane and that extend toward the front from the air intake 12, in the upper part from the stationary part 14, and meet up again in the lower part, and that optionally adjoin one or more stationary parts at the rear (not shown and not presented in more detail).

However, the invention is not limited to this embodiment and covers numerous variants. Thus, the nacelle could comprise only a single door 16.

The invention is described as applied to a door.

The door comprises articulation means that make it possible to occupy a first state that corresponds to the closed position in which it seals an opening 20, whereby the outside surface of the door is at the same level as those of the other elements that form the nacelle, and another state that corresponds to the open position in which the door at least partially releases the opening 20.

The articulation means as well as the optional maneuvering means that make it possible to move the door are not presented in more detail because they are known to one skilled in the art.

In addition, the door comprises locking means 24 that make it possible to keep the door in the closed position. In the presence of two contiguous doors in the lower part, the locking means are preferably arranged on the lower edge of the doors, whereby the articulation means are arranged at the upper edge. These locking means are not presented in more detail because they are also known to one skilled in the art.

As illustrated in FIGS. 4 and 5, the opening 20 is delimited by a peripheral edge, of which one portion 26 extends upstream from the door 16 in the direction of flow of the aerodynamic stream that is indicated by the arrow 28.

According to the example that is illustrated in the figures, the edge 26 of the opening upstream from the door corresponds to the rear edge of the air intake 12. However, this edge of the opening could be provided at another stationary or moving element.

The peripheral edge of the opening can comprise a support surface 30 that is offset toward the interior of the nacelle against which the door 16 can rest in the closed position so that said door does not penetrate too far into the interior of the nacelle and so that its outside surface remains in the extension of the other outside surfaces of the nacelle.

According to one embodiment, this support surface 30 corresponds to the upper surface of one branch of a T 32 whose upper surface of the other branch is made integral with the inside surface of the wall of the air intake at the peripheral edge of the opening.

In addition, a flexible element such as a compressible joint can be connected at the support surface 30 for ensuring the sealing.

The door 16 comprises an edge 34 that extends in a manner that is secant with the aerodynamic stream 28, placed upstream from the door in the direction of flow of said stream, close to the edge 26 of the opening so as to limit the disruptions of the aerodynamic stream.

The door 16 comprises a wall 36, for example a piece of sheet metal, reinforced by stiffeners, not shown. This wall 36 has a curved cross-section along a transverse plane, in accordance with the circular profile of the nacelle.

To limit the scooping phenomenon, the door 16 comprises—close to the upstream edge 34—a stiffening device that comprises a flexible element 38 that is inelastic under load with preferably a retraction effect under negative temperatures, in particular during flight, of the guide means 40 that make it possible for the flexible element 38 to follow the curved profile of the door, the flexible element 38 comprising a first anchoring point 42 close to a first end of the curved profile of the door and a second anchoring point 44 close to the second end of the curved profile of the door and being stretched between the two anchoring points 42 and 44.

Without significantly increasing the on-board weight, this solution makes it possible to increase the stiffness of the door so as to limit the appearance of the scooping phenomenon and thus to reduce the disruptions of the drag. This device that is placed inside the nacelle makes it possible to prevent the door from moving radially toward the outside of the nacelle.

According to one embodiment that is illustrated in the different figures, the flexible element 38 comes in the form of a cable or the like. As a variant, a strip could be used as a flexible element.

Flexible element is defined as one or more flexible elements that are connected to one another.

Advantageously, the flexible element can be prestressed.

As appropriate, the flexible element 38 can be stretched or prestressed only when the door is in the closed position or in its permanent position.

The flexible element 38 is preferably placed in a sheath 46.

According to one embodiment, the guide means 40 comprise at least one angle bar 48 that may or may not be directly flattened against the inside surface of the door, whose cross-section makes it possible to delimit a housing for the flexible element 38, the latter being trapped between said angle bar and the door. These guide means 40 make it possible for the flexible element to follow the profile of the door.

As appropriate, the guide means 40 comprise a single angle bar or several aligned angle bars that may or may not be spaced.

These guide means 40 can have different shapes and be metallic or made of composite materials according to ambient constraints. In FIGS. 4 and 5, two different variants are shown. According to FIG. 5, the angle bar that forms the guide means is flattened directly against the inside surface of the door. According to FIG. 4, the angle bar is flattened against a plate 50 (whose function will be presented in more detail below), itself flattened against the inside surface of the door.

According to another variant that is illustrated in FIG. 8, the guide means comprise small wheels 51 that are integral with the door 36 using plates that are provided at each end of each small wheel 51. According to this variant, the flexible element 38 passes between the small wheels 51 and the door so as to follow approximately the profile of said door. The small wheels 51 are spaced by a suitable distance that makes it possible for the flexible element 38 to follow approximately the profile of the door 36.

According to other variants, the guide means can be obtained by a combination of different guide means, for example angle bars and small wheels.

The device can comprise means 52 for stretching the flexible element and for prestressing it during flight, and preferably when the door is in the closed position.

Advantageously, the means 52 for stretching the cable are controlled by the means 24 for locking the door so that the cable is stretched when the locking means are in the locked state corresponding to the closed position of the door and extended when said means 24 are in the unlocked state corresponding to the open position of the door.

According to one embodiment, the flexible element comes in the form of a cable that is placed in a sheath 46 that comes into contact with each of its ends against a stop 54. At each end of the sheath, the cable 38 whose length is greater than that of the sheath is no longer covered by the sheath, and its ends are connected at the upper part to means 22 for articulation between the door 16 and the cap 14 (presented in more detail below) and in the lower part to means 24 for locking the door.

Thus, when the locking means 24 are in the locked state, they exert stress on the flexible element 38. On the contrary, when the locking means 24 are in the unlocked state, they release the cable.

Preferably, the device comprises means 56 for adjusting the prestressing, for example a roller that regulates the length of the cable that is not protected by the sheath at at least one of the ends of the cable.

So as to limit the scooping phenomena even more, in particular in the most sensitive zones located at 3 o'clock and at 9 o'clock, it is possible to provide safety indices 58, illustrated in detail in FIG. 9, at least one safety index being integral with each door 16, at sensitive zones located at 3 o'clock and 9 o'clock. A safety index comprises a latch 60 that can pivot around an axis of rotation 62 that is connected to the door 16 so as to occupy a so-called locked position, illustrated in heavy lines, in which the end of the latch 60 can rest against the inside surface of the edge 26 upstream from the door 16 that generally corresponds to the air intake 12 and another so-called unlocked position, illustrated in dotted lines, in which the end of the latch 60 is offset relative to the edge 26. Thus, in the locked position, the latch 60 prevents the scooping phenomena by limiting the movements of the door in the radial direction toward the outside of the nacelle. In the unlocked position, the latch 60 allows the opening of the door 16, no longer being held by the edge 26.

So that all of the forces are not taken up by the axis of rotation 62, one piece 64 that comprises a support surface is connected to the door 16 and placed between the axis of rotation 62 and the edge 26, close to the edge of the door 16 that can work with the edge 26. This support piece 64 comprises a part that is integral with the door 16 and a part 66 that is offset from the inside surface of the door. The arrangement of this support piece 64 is adjusted based on the axis of rotation 62 and the latch in such a way that when the latch 60 occupies the locked position, it is placed between the part 66 and the door 16 so that the support piece 64 takes up a portion of the forces.

The latch 60 can be connected to the flexible element 38 in such a way as to synchronize the stress of the flexible element 38 and the pivoting of the index 58 in the locked position. For this purpose, the connecting means 68 between the flexible element 38 and the index 58 comprise an element 70 that is integral with the flexible element 38 that comprises a part that can slide into a slot 72 that is made in the index 58. Thus, the stress of the flexible element 38 causes the translation of the connecting element 70 in a direction that is parallel to the edge 26 that produces the rotation of the index 58.

In addition, at the edge 34, the device for stiffening the door can comprise a groove 74 that can be housed in an undercut 76 whose opening is oriented toward the outside of the nacelle and placed at the support surface 30. According to one embodiment that is illustrated in FIG. 4, the groove 74 is provided at a plate 50 that is inserted between the door and the angle bar 40.

The groove 74 and/or the undercut 76 can extend over the entire length of the edge 34 of the door or not, over one or more segments.

As a variant, other shapes can be provided at the edge of the door and the edge of the opening. These additional shapes can be of the static type as described above or of the dynamic type and can allow one or more degrees of freedom.

According to the variant that is illustrated in FIG. 2, in the case of a nacelle with two doors extending from the foot of the mast to the lower portion, the two doors are outfitted with stiffening devices that make it possible to obtain a device for encircling the nacelle.

According to the variants, the device for encircling the nacelle can comprise one or more flexible elements 38 that are connected directly or indirectly to one another, one of them being connected to an anchoring point 42 that is located at a first edge 78 of the cap and another being connected to an anchoring point 42 that is located at a second edge 80 of the cap. The flexible element(s) 38 is/are stretched between the two anchoring points and exert(s) a radial pressure force on the door(s) and the cap. Preferably, the flexible elements have a tendency to retract with negative temperatures, in particular during flight, which tends to increase the radial forces.

As above, the means 52 for stretching the cable are controlled by the means 24 for locking the door so that the cable is stretched when the locking means are in the locked state corresponding to the closed position of the door and extended when said means 24 are in the unlocked state corresponding to the open position of the door.

Preferably, the anchoring points 42 are placed at the front of the cap.

According to the invention, the anchoring points 42 allow a relative translational movement in a direction that is parallel to the longitudinal axis of the nacelle, between the cap 14 and the doors 16. This arrangement makes it possible to simplify the connection between the cap and the nacelle by eliminating the complex connecting systems of the prior art.

According to an embodiment that is illustrated in FIG. 6, an anchoring point 42 comprises a plate 82 that is attached at the inside surface of the cap 14 and that extends below the inside surface of the door 16. This plate 82 supports an axis 84 that extends in the longitudinal direction, whereby each end of said axis 84 is connected to the plate 82. At its end, the flexible element 38 that is connected to the anchoring point 42 comprises a ring 86 that is able to slide along said axis 84. Thus, the connection between the axis 84 and the ring 86 makes it possible to take up the forces, in particular in a plane that is perpendicular to the longitudinal direction, while allowing a relative movement between the two elements in the longitudinal direction.

The invention claimed is:

1. An aircraft nacelle comprising:
    an air intake with a cap at an upper part and a door with a curved profile, the cap being integral with a mast and the door being movable along a longitudinal axis of the aircraft nacelle;
    a flexible element that extends around an interior surface of the door;

a guide that causes the flexible element to follow the curved profile of the door; and a first anchoring point for the flexible element that is attached to a first edge of the cap and a second anchoring point for the flexible element that is attached to a second edge of the cap, wherein the first and second anchoring points each comprises an axis attached to the cap and extending along the longitudinal axis of the nacelle, and wherein the flexible element comprises a ring at each end, each ring being adapted to slide along a respective said axis so as to permit relative translational movement, in a direction parallel to the longitudinal axis of the nacelle, between the cap and the door.

2. The aircraft nacelle according to claim 1, further comprising means for stretching the flexible element when the door is in a closed position.

3. The aircraft nacelle according to claim 2, wherein the means for stretching the flexible element is controlled by means for locking the door so that the flexible element is stretched when the means for locking is in a locked state corresponding to the closed position of the door and extended when the means for locking is in an unlocked state corresponding to an open position of the door.

4. The aircraft nacelle according to claim 1, wherein the flexible element is prestressed.

5. The aircraft nacelle according to claim 4, further comprising means for adjusting the prestressing of the flexible element.

6. The aircraft nacelle according to claim 1, wherein the guide comprises an angle bar on an inside surface of the door, the angle bar having a cross-section that delimits a housing for the flexible element so that the flexible element is trapped between the angle bar and the door.

7. The aircraft nacelle according to claim 1, wherein the door closes an opening that comprises a support surface against which rests the door when the door is in a closed position so that an outside surface of the door is flush with an outside surface of the nacelle.

8. The aircraft nacelle according to claim 1, further comprising a safety index that comprises a latch that pivots around an axis of rotation that is connected to the door so as to occupy (a) a locked position in which an end of the latch rests against an inside surface of an edge upstream from the door and that is integral with the air intake, and (b) an unlocked position in which the end of the latch is offset relative to the edge, the latch being arranged to prevent, when in the locked position, air scooping by limiting movement of the door in the radial direction toward the outside of the nacelle.

9. The aircraft nacelle according to claim 1, further comprising, a second door with a curved profile, a segment of the flexible element extending around an interior surface of the second door, the second door having a further guide that causes the segment of the flexible element to follow the curved profile of the second door, and a further anchoring point for the segment of the flexible element and attached to the second door near an edge thereof.

* * * * *